United States Patent
Nemiroff et al.

(10) Patent No.: US 7,447,231 B2
(45) Date of Patent: Nov. 4, 2008

(54) DS3 TO ASI CONVERTER WITH REDUCED MEMORY

(75) Inventors: Robert S. Nemiroff, Carlsbad, CA (US);
Michael A. Casteloes, Poway, CA (US);
Ken-Ho Chang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 580 days.

(21) Appl. No.: 11/030,034

(22) Filed: Jan. 6, 2005

(65) Prior Publication Data

US 2005/0259695 A1  Nov. 24, 2005

Related U.S. Application Data

(60) Provisional application No. 60/534,418, filed on Jan. 6, 2004.

(51) Int. Cl.
  *H04J 3/16* (2006.01)
(52) U.S. Cl. ........................ 370/466; 370/503
(58) Field of Classification Search ................ 370/466, 370/467, 473, 486, 493, 503, 510, 517
See application file for complete search history.

(56) References Cited

U.S. PATENT DOCUMENTS

| 5,640,388 | A  | * | 6/1997  | Woodhead et al. | 370/468 |
| 6,185,215 | B1 | * | 2/2001  | Aho             | 370/402 |
| 6,493,362 | B1 | * | 12/2002 | Inazumi         | 370/537 |
| 2003/0223466 | A1 | * | 12/2003 | Noronha et al. | 370/537 |

* cited by examiner

*Primary Examiner*—Ricky Ngo
*Assistant Examiner*—Wei-Po Kao
(74) *Attorney, Agent, or Firm*—Stewart M. Wiener

(57) ABSTRACT

Converting a DS3 transport stream to MPEG-2 packets over an ASI transport stream includes extracting MPEG-2 packets along with PCR values, calculating a new PCR value to compensate for packet time shift, and replacing the extracted PCR value with the new PCR value prior to outputting MPEG-2 packets. An apparatus for processing a DS3 transport stream carrying an MPEG-2 payload includes a DS3 receiver to receive the stream and to output a data signal and clock signal. The DS3 receiver includes a DS3 interface to receive DS3 packets and discard null packets, and includes PCR correction to determine if received DS3 packets include PCR values and to adjust PCR values prior to outputting the MPEG-2 packet. Packets are output without storing each packet in a buffer, but storing the PCR value in the buffer.

20 Claims, 3 Drawing Sheets

DS3 TO ASI CONVERTER WITH REDUCED MEMORY

STATEMENT OF RELATED APPLICATION

This application claims the benefit of priority of U.S. Provisional Patent Application Ser. No. 60/534,418, filed Jan. 6, 2004, entitled DS3 To ASI Converter With Reduced Memory, which is incorporated herein by reference in its entirety.

FIELD OF THE INVENTION

The present invention relates generally to methods and apparatuses for communicating, and more particularly to a method and apparatus for communicating data across various data formats.

BACKGROUND

DS3 to ASI conversion is necessary in many data transport applications. DS3 RSM (Remote Satellite Modulation) packets are transmitted at 44.736 Mhz. The information rate is defined by the Viterbi code and symbol rate. The information rate is a constant bit rate. In the MPEG-2 encoder and transcoder, the information within the DS3 payload is MPEG-2 transport packets. Since the information rate and DS3 rate are different, some DS3 packets will contain MPEG-2 packets, while some DS3 packets will be null. The MPEG-2 packets are then transmitted over ASI transport.

When converting DS3 to ASI, the DS3 headers must be stripped and the MPEG-2 transport information must be extracted. Data is present for some DS3 packets, but not present in other packets, therefore, the extracted MPEG-2 packets output over an ASI transport stream is not output at a constant bit rate, but is bursty. The MPEG-2 data is typically rate converted to provide constant ASI bit rate at the information rate. This is performed by writing the extracted MPEG-2 packets into a buffer (e.g., a First-In-First Out (FIFO) memory), then reading the data from the buffer at the information rate.

This technique requires memory for the FIFO. Typically 10-15 packets are stored in the FIFO, which would require up to 15*188 or 2820 bytes of memory for each channel. This amount of memory is costly in a field programmable gate array (FPGA).

The present invention is therefore directed to the problem of developing a method and apparatus for converting DS3 to ASI using less memory.

SUMMARY OF THE INVENTION

The present invention solves these and other problems by rather than outputting the MPEG-2 packets over an ASI transport at the information rate, the MPEG-2 packets are output over the ASI transport bursty as they arrive in a DS3 payload. The PCR fields in the packets are then corrected to compensate for the packet time shift. Given that the MPEG-2 packets are output over the ASI transport as they arrive, a buffer is not required.

According to one aspect of the present invention, an exemplary embodiment of a method for a converting a Digital Service Level Three (DS3) transport stream to a plurality of Moving Pictures Expert Group (MPEG) packets over an Asynchronous Serial Interface (ASI) transport stream includes: extracting each of the MPEG-2 packets from the DS3 transport stream; extracting each program clock reference (PCR) value in the MPEG-2 packets; calculating a new PCR value for each of the extracted PCR values to compensate for a packet time shift; and replacing each extracted PCR value with the new PCR value prior to outputting each of the MPEG-2 packets. According to this embodiment, each of the MPEG-2 packets is output over ASI upon arrival in the DS3 transport stream without storing the MPEG-2 packets in a buffer but rather only storing the extracted PCR in memory.

According to another aspect of the present invention, an apparatus for processing a Digital Service Level Three (DS3) transport stream carrying an MPEG-2 payload includes a DS3 receiver to receive the DS3 transport stream and to output a data signal and a clock signal. According to this embodiment, the DS3 receiver includes a DS3 interface device to receive DS3 packets and to discarding null packets among the received DS3 packets and a DS3 PCR correction device to determine if each received DS3 packet includes a program clock reference (PCR) value and to adjust the PCR value, if present, by a difference of a time that said each DS3 packet arrives (TS_pkt), and a time at which said each MPEG-2 packet over ASI would start to be transmitted (TS_info) prior to outputting said each MPEG-2 packet.

Other aspects of the present invention will be apparent upon review of the detailed description in light of the following drawings.

DETAILED DESCRIPTION

Figure 1:
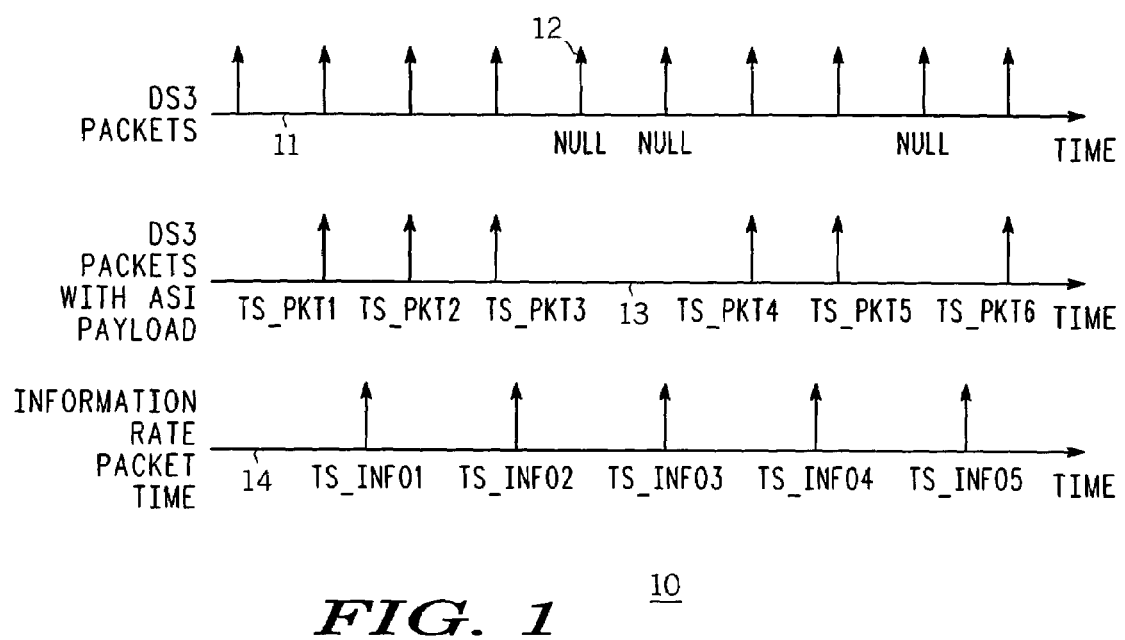
FIG. 1 depicts an exemplary embodiment of a timing diagram applicable to certain embodiments of the present invention according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to one aspect of the present invention, rather than outputting the MPEG-2 packets at the information rate, the MPEG-2 packets are output bursty over ASI as they arrived in the DS3 payload. However, the PCRs are corrected to compensate for the packet time shift.

The following describes the ASI to DS3 back to ASI process. MPEG-2 transport packets are generated at a fixed rate. In this case those packets are put in ASI (Asynchronous Serial Interface). ASI is a physical layer used for MPEG-2 transport streams. In general, this description involves transport packets generated at a fixed transport rate. DS3 is a physical layer of ATM (Asynchronous Transfer Mode). DS3 defines the data format. DS3 defines an information rate. There are pre-defined information rates. The information rate is computed from the code rate and the symbol rate. The code and symbol rate are fields defined in the DS3 header. When data is put into the DS3 layer, some DS3 packets will contain information payload, while other packets will not. The DS3 packets that do not contain information are tagged as NULL packets. Note that the payload data (e.g., MPEG-2 transport packets), has been generated at exactly the information rate. When a DS3 receiver extracts data, the DS3 receiver traditionally outputs the information payload data at a fixed rate, which fixed rate is the information rate defined in the DS3 header. This method requires no adjustment to the PCRs (Program Clock Reference) fields. The PCRs are located in some of the MPEG-2 transport packets. The MPEG-2 transport packets are in the DS3 information payload in this case. This requires FIFO memory since the payload must be buffered enough to allow the FIFO to be read at the information rate without underflowing. In contrast, the present invention does not read the FIFO at the fixed information rate, but rather reads the buffer as soon as a packet has been extracted from the DS3 receiver. However, since the payload output timing has now changed, the PCR fields are adjusted to account for this change in timing.

According to one aspect of the present invention, the MPEG-2 packets are not stored in a FIFO, but rather, the time at which each MPEG-2 packets would start to be transmitted over ASI, time stamp information (ie., TS_info), is stored in a FIFO. When a DS3 packet arrives with an MPEG-2 payload, a check is performed for packets with a PCR. If the packet contains a PCR, the PCR is adjusted by the difference of the time that each DS3 packet arrives (i.e., TS_pkt), and the time at which that ASI packet would start to be transmitted (i.e., TS_info). A small FIFO is needed for the information rate time stamps (i.e., TS_info); the FIFO size is 15*4=60 bytes. Four bytes are used for each time stamp.

Turning to FIG. 1, shown therein is a DS3 RSM Timing Diagram 10. The top chart 11 shows the DS3 packets arrival time. The middle chart 13 shows the DS3 packets with MPEG-2 payload over ASI where each packet has arrived at time TS_pkt(n). This is the time, plus a constant processing delay, which the MPEG-2 packets over packets ASI are output. The bottom chart 14 shows the time (i.e., TS_info(n)) the corresponding packet would have been output using the traditional large FIFO technique. The difference between TS_pkt(n) and TS_info(n) represents the packet jitter caused by failing to rate adjust the packets. Therefore, the PCRs must be corrected to account for the packet jitter (i.e., TS_pkt(n)-TS_info(n)). Null packets 12 are added to the DS3 packet stream to ensure adequate timing recovery.

Figure 2:
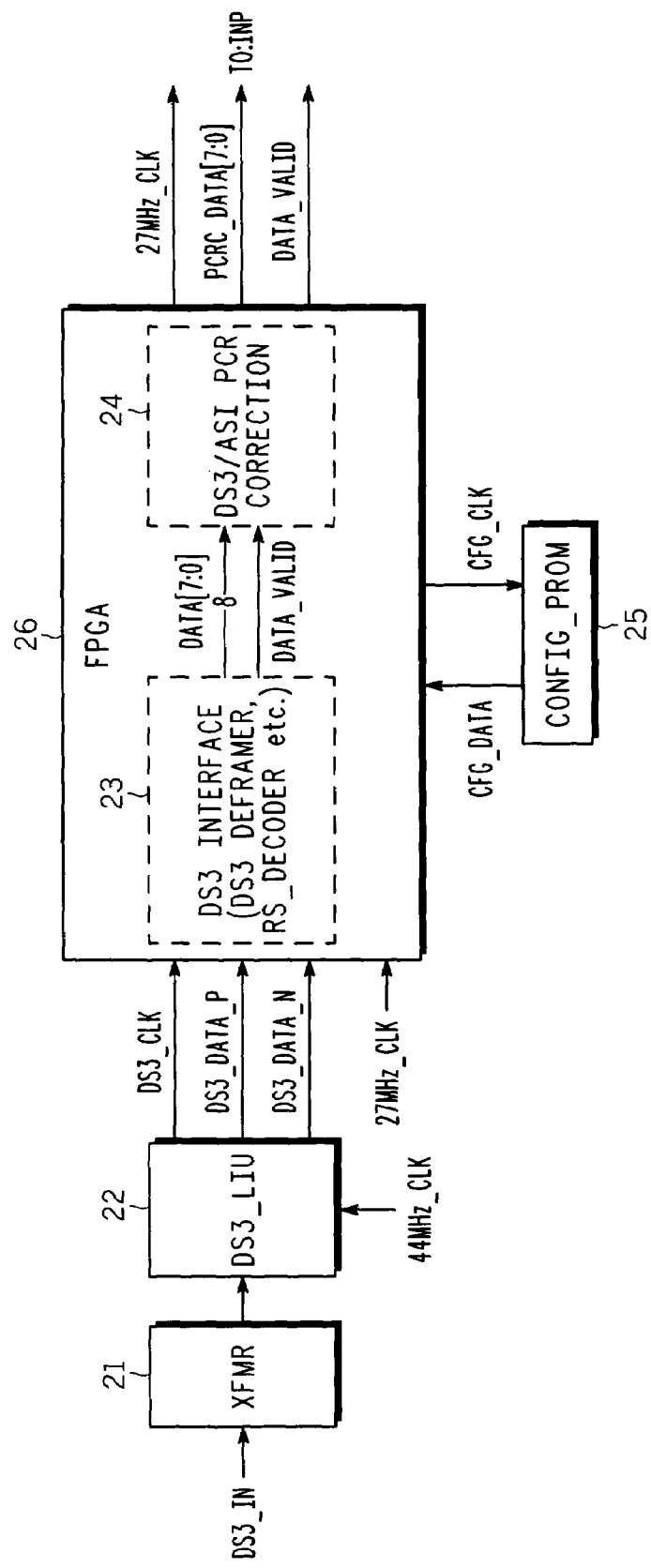
FIG. 2 depicts a block diagram of an exemplary embodiment of an apparatus according to another aspect of the present invention.

Turning to FIG. 2, shown therein is an exemplary embodiment of a DS3 RSM Block Diagram 20 showing the hardware block diagram of the DS3 to ASI converter. (Note that any reference to 44 Mhz is actually 44.736 Mhz). The DS3 receiver 26 includes as an input a DS3 stream and has as an output a DS3 payload, which includes MPEG-2 transport packets.

The DS3 stream received is represented by signal DS3_IN and passes through an isolation transformer, XFMR 21. A local oscillator (not shown) generates the signal 44 Mhz_CLK, which is the 44.736 Mhz clock. The DS3 data rate is 44.736 Mbps (Mega bits per second).

DS3_LIU 22 is a line interface unit. The DS3_LIU block 22 phase locks the 44.736 Mhz clock to the DS3_IN signal. DS3_CLK is the phase locked clock. DS3_DATA_P and DS3_DATA_N (positive and negative) are differential signals of the DS3 data.

The 27 MHZ_CLK is generated from a local oscillator (not shown). It will be used later to create a 27 Mhz clock locked to the input DS3_CLK.

The FPGA 26 has two main blocks DS3 INTERFACE 23 and DS3/ASI PCR CORRECTION 24. The DS3 INTERFACE 23 inputs the DS3_CLK and DS3 data (DS3_DATA_P & DS3_DATA_N). The DS3_DATA then passes through a DS3 deframer (not shown) and RS_Decoder (Reed-Solomon—not shown). (The information data within the DS3 payload had been Reed-Solomon encoded for error correction in the DS3 transmitter).

The DS3 INTERFACE 23 transfers the DS3 deframed data, which includes DS3 header and DS3 payload, to the DS3/ASI PCR CORRECTION block 24. The data path is 8 bits wide, DATA[7:0], with a DATA_VALID to indicate DATA is valid. Data is transferred with the 44.736 Mhz clock, DS3_CLK.

The DS3/ASI PCR CORRECTION block 24 extracts the code and symbol rate. DS3 NULL packets (element 12, FIG. 1) are removed. PCR fields are detected and modified with a new PCR value. The new PCR value is computed in the DS3/ASI PCR CORRECTION block 24.

The DS3/ASI PCR CORRECTION block outputs PCRC_DATA[7:0], which is PCR Corrected MPEG-2 Transport Data. The data is output with a 27 Mhz clock, which is derived from the DS3_CLK. DATA_VALID is active when PCRC_DATA[7:0] is outputting valid data. This output goes to the Input Board (INP) on the Motorola TMX2010 system.

The config_prom block 25 is a PROM that programs the FPGA at powerup. After the FPGA is programmed, config_prom 25 remains unused.

Figure 3:
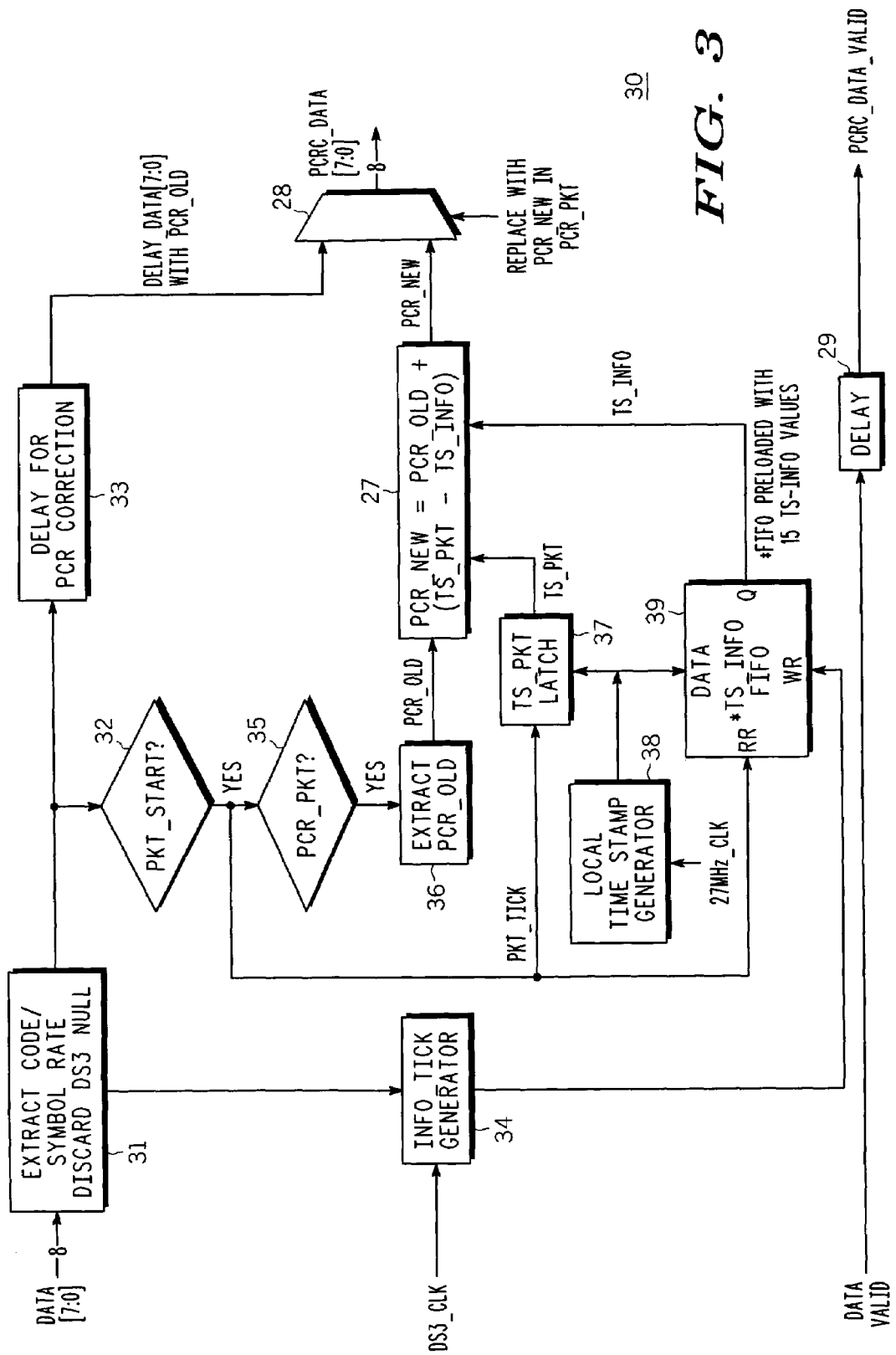
FIG. 3 depicts a block diagram of an exemplary embodiment of a method for DS3 RSM PCR correction according to yet another aspect of the present invention.

Turning to FIG. 3, shown therein is an exemplary embodiment of a DS3 RSM PCR Correction Diagram 30, which shows the process flow. This is a detailed diagram of the DS3/ASI PCR CORRECTION block 24 from the exemplary embodiment of the DS3 RSM Block Diagram 20. DATA[7:0] is input to the EXTRACT CODE/SYMBOL RATE DISCARD DS3 NULL block 31. Note that DATA_VALID should also go to block 31 for completeness.

The code and symbol rate are transferred to the info_tick GENERATOR block 34, which block 34 generates the information clock from the DS3_CLK (44.736 Mhz) and symbol and code rates. Block 34 outputs a tick at the transport rate, which is the information rate (bits/sec) divided by (8 bits/byte*188 bytes/packet). One tick is generated for each MPEG-2 packet output at the information bit rate.

MPEG-2 transport data is output from the EXTRACT CODE/SYMBOL RATE DISCARD DS3 NULL block 31 and sent to the DELAY FOR PCR CORRECTION block 33, which block 33 delays the data by the number of cycles required to compute a new PCR (e.g., forty 27 Mhz cycles).

MPEG-2 transport data is output from the EXTRACT CODE/SYMBOL RATE DISCARD DS3 NULL block 31 and sent down to the PKT_START? decision block 32. If this is a packet start (determined in decision block 32) and this is a packet with a PCR (determined in decision block 35), the PCR is extracted in the EXTRACT PCR_old block 36. If this is not the start of a packet (determined in decision block 32) or not a PCR packet (determined in decision block 35), no PCR is extracted.

When a PKT_START is detected in decision block 32, a pkt_tick signal is sent to the TS_pkt latch 37, which latches the time this packet has arrived. The time is based on the 27 MHz_CLK. The LOCAL TIME STAMP GENERATOR 38 keeps a counter that tracks local time.

When the info_tick GENERATOR block 34 produces a tick at the information packet rate, the Local Time is stored in the TS_info FIFO 39. FIFO 39 stores up to fifteen (15) TS_info values. FIFO 39 must store enough values to allow for the worst case burst of consecutive DS3 packets with MPEG-2 payload.

The TS_info value represents the time the input packet was put in the MPEG-2 transport at the information rate. The TS_pkt value represents the time the input packet will be output, PCRC_DATA[7:0]. Since the packet is output at time TS_pkt, but should have been output at time TS_info, the PCR must be adjusted by TS_pkt−TS_info.

The PCR_old is corrected to PCR_new in the PCR_new=PCR_old+(TS_pkt−TS_info) block 27. The output mux 28 switches to PCR_new to replace the PCR_old in the DELAY_DATA[7:0] output from the DELAY FOR PCR CORRECTION block 33.

The output from DS3RSM PCR CORRECTION 30 also contains an output data valid signal, PCRC_DATA_VALID. This signal is simply a delayed version of the input DATA_VALID signal, delayed by delay element 29. The delay of delay element 29 is equal to the DATA[7:0] input to PCRC_DATA[7:0] delay by delay element 33.

The embodiments of the present invention may be applied to any coder-decoder that performs the following:
1. Inputs data-packets with time stamps (in an exemplary embodiment, MPEG-2 packets with PCRs).
2. Encapsulates those data-packets in a new transport and shifts each packet by a variable time shift (in an exemplary embodiment the new transport is DS3).
3. Does not alter the time stamps of the data-packets at transmission (in an exemplary embodiment the MPEG-2 packets over ASI are not altered).
4. Receives the encapsulated packets and extracts the original data-packets (in an exemplary embodiment, the DS3 header is extracted).
5. Restores the delay of each data-packet to their original timing (in an exemplary embodiment, instead of restoring the data-packet output timing, the PCR is adjusted to compensate for this time shift).

Although various embodiments are specifically illustrated and described herein, it will be appreciated that modifications and variations of the invention are covered by the above teachings and are within the purview of the appended claims without departing from the spirit and intended scope of the invention. For example, certain clock signals and timing diagrams are depicted, however, others may apply without departing from the scope of the present invention. Furthermore, these examples should not be interpreted to limit the modifications and variations of the invention covered by the claims but are merely illustrative of possible variations.

What is claimed is:

1. A method for a converting a Digital Service Level Three (DS3) transport stream to a plurality of Moving Pictures Expert Group (MPEG) packets over Asynchronous Serial Interface (ASI) transport stream comprising:
   extracting each of a plurality of MPEG-2 packets from the DS3 transport stream;
   extracting each program clock reference (PCR) value in the plurality of MPEG-2 packets;
   calculating a new PCR value for each of the extracted PCR values to compensate for a packet time shift;
   replacing each extracted PCR value with the new PCR value prior to outputting each of the plurality of MPEG-2 packets; and
   outputting each of the plurality of MPEG-2 packets upon arrival in the DS3 transport stream without storing said each of the plurality of MPEG-2 packets in a buffer but storing the extracted PCR value in the buffer.

2. The method according to claim 1, the step of outputting further comprising:
   only storing the extracted PCR value in the buffer.

3. The method according to claim 1, further comprising:
   delaying an output of each of the plurality of MPEG-2 packets over ASI for a predetermined time.

4. The method according to claim 1, further comprising:
   generating a timing signal (TS_pkt) indicating a time that each MPEG-2 packet arrives; and
   generating a timing signal (TS_info) indicating a time that each MPEG-2 packet should be output over the ASI transport stream, wherein said calculating includes calculating a following formula:
   PCR_new=PCR_old+(TS_pkt−TS_info) in which PCR_new is said new PCR value and PCR old is said extracted PCR value.

5. A method for processing a Digital Service Level Three (DS3) transport stream carrying a Moving Pictures Expert Group (MPEG) payload over an Asynchronous Serial Interface (ASI) transport comprising:
   receiving a plurality of DS3 packets and discarding one or more null packets among the received plurality of DS3 packets;
   determining if each received DS3 packet of the plurality of DS3 packets includes a program clock reference (PCR) value;
   adjusting the PCR value, if present, by a difference of a time that said each DS3 packet arrives (TS_pkt), and a time at which said each MPEG-2 packet would start to be transmitted over the ASI transport (TS_info) prior to outputting said each MPEG-2 packet; and
   outputting each of the plurality of MPEG-2 packets over the ASI transport upon arrival in the DS3 transport stream without storing said each of the plurality of MEPG-2 packets in a buffer, but storing the PCR value in the buffer.

6. The method according to claim 5, the step of outputting further comprising:
   only storing the PCR value in the buffer.

7. The method according to claim 6, further comprising:
   delaying said outputting of each of the plurality of MPEG-2 packets over the ASI transport for a predetermined time.

8. The method according to claim 5, further comprising:
   storing the extracted PCR in a memory device.

9. The method according to claim 5, further comprising:
   generating a timing signal (TS_pkt) indicating a time that each MPEG-2 packet arrives; and
   generating a timing signal (TS_info) indicating a time that each MPEG-2 packet should be output over the ASI transport, wherein said calculating includes calculating a following formula:
   PCR_new=PCR_old+(TS_pkt−TS_info) in which PCR_new is said new PCR value and PCR_old is said extracted PCR value.

10. An apparatus for processing a Digital Service Level Three (DS3) transport stream carrying a Moving Pictures Expert Group (MPEG) payload over Asynchronous Serial Interface (ASI) transport comprising:
   a DS3 receiver to receive the DS3 transport stream and to output a data signal and a clock signal, said DS3 receiver including:
      a DS3 interface device to receive a plurality of DS3 packets and discarding one or more null packets among the received plurality of DS3 packets; and
      a DS3 PCR correction device to determine if each received DS3 packet of the plurality of DS3 packets includes a program clock reference (PCR) value and to adjust the PCR value, if present, by a difference of a time that said each DS3 packet arrives (TS_pkt), and a time at which said each MPEG-2 packet would start to be transmitted over the ASI transport (TS_info) prior to outputting said each MPEG-2 packet;
   wherein said DS3 receiver outputs each of the plurality of MPEG-2 packets over the ASI transport upon arrival in the DS3 transport stream without storing said each of the plurality of MPEG-2 packets in a buffer, but storing the PCR value in the buffer.

11. The apparatus according to claim 10, further comprising:
a transformer to receive the DS3 transport stream.

12. The apparatus according to claim 11, further comprising:
a line interface unit to be coupled to the transformer and to output a DS3 Data signal and a DS3 clock signal.

13. The apparatus according to claim 10, wherein said DS3 interface device extracts each of a plurality of MPEG-2 packets from the DS3 transport stream.

14. The apparatus according to claim 10, wherein said DS3 PCR correction device:
extracts each PCR value in the plurality of MEPG-2 packets;
calculates a new PCR value for each of the extracted PCR values to compensate for a packet time shift; and
replaces each extracted PCR value with the new PCR value prior to outputting each of the plurality of MPEG-2 packets.

15. The apparatus according to claim 10, wherein storing the PCR value in the buffer comprises only storing the PCR value in the buffer.

16. The apparatus according to claim 10, wherein said PCR correction device delays an output of each of the plurality of MPEG-2 packets over the ASI transport for a predetermined time while adjusting the PCR value.

17. The apparatus according to claim 10, wherein said PCR correction device:
generates a timing signal (TS_pkt) indicating a time that each MPEG-2 packet arrives;
generates a timing signal (TS_info) indicating a time that each MPEG-2 packet should be output over the ASI transport; and
calculates a following formula:
PCR_new=PCR_old+(TS_pkt−TS_info) in which PCR_new is said new PCR value and PCR old is said extracted PCR value.

18. The apparatus according to claim 10, wherein said DS3 receiver comprises a field programmable gate array.

19. The apparatus according to claim 18, wherein said DS3 interface device comprises a first portion of the field programmable gate array and the DS3 PCR correction device comprises a second portion of the field programmable gate array.

20. The apparatus according to claim 10, further comprising:
a configuration memory device to configure the DS3 receiver upon startup.

* * * * *

UNITED STATES PATENT AND TRADEMARK OFFICE
CERTIFICATE OF CORRECTION

PATENT NO. : 7,447,231 B2  
APPLICATION NO. : 11/030034  
DATED : November 4, 2008  
INVENTOR(S) : Nemiroff et al.

Page 1 of 1

It is certified that error appears in the above-identified patent and that said Letters Patent is hereby corrected as shown below:

COLUMN 7:  
Line 11: In Claim 12, please delete "Data" and replace with --data--

Signed and Sealed this

Twenty-second Day of September, 2009

David J. Kappos  
*Director of the United States Patent and Trademark Office*